United States Patent [19]
Venkatesan et al.

[11] Patent Number: 5,327,784
[45] Date of Patent: Jul. 12, 1994

[54] APPARATUS FOR MEASURING THE PRESSURE INSIDE A RECHARGEABLE ELECTROCHEMICAL CELL

[75] Inventors: Srinivasan Venkatesan, Southfield; George Burke, Detroit; Ken Laming, Columbus; Subhash Dhar, Rochester, all of Mich.

[73] Assignee: Ovonic Battery Company, Inc., Troy, Mich.

[21] Appl. No.: 910,956

[22] Filed: Jul. 9, 1992

[51] Int. Cl.$^5$ .............................................. G01L 7/00
[52] U.S. Cl. ........................................ 73/714; 73/756
[58] Field of Search ..................... 73/756, 52, 49.2 R, 73/49.3, 45.4, 866.5, 863.85, 714

[56] References Cited

U.S. PATENT DOCUMENTS

| | | | |
|---|---|---|---|
| 3,958,448 | 5/1976 | Willis et al. | 73/52 |
| 4,208,903 | 6/1980 | Hopper et al. | 73/52 |
| 4,281,536 | 8/1981 | Kraft et al. | 73/52 |
| 4,577,511 | 3/1986 | Wetzel | 73/756 |
| 4,667,506 | 5/1987 | Jenkins et al. | 73/49.2 R |
| 4,727,006 | 2/1988 | Malinowski et al. | 73/52 |
| 4,928,539 | 5/1990 | Champseix et al. | 73/863.85 |
| 4,930,342 | 6/1990 | McDaniel | 73/49.3 |
| 4,951,512 | 8/1990 | Mazza et al. | 73/866.5 |

*Primary Examiner*—Richard E. Chilcot, Jr.
*Assistant Examiner*—William L. Oen
*Attorney, Agent, or Firm*—Marc J. Luddy; Marv S. Siskind; Dave W. Schumaker

[57] ABSTRACT

An apparatus for accurately measuring pressure within a rechargeable cell, the apparatus comprising: a frame, the frame including at least one cavity adapted to releasably seat a rechargeable cell; a fixed brace defining a first end of the at least one cavity; a movable brace defining the end of the at least one cavity opposite from the fixed brace, the movable brace including a hollow needle, the hollow needle having a pointed end which is operatively directed toward one end of a rechargeable cell disposed in the cavity, and means for sealing a point where the hollow needle is inserted into a rechargeable cell; a pressure transducer operatively connected with the hollow needle; and means for controllably moving the movable brace relative to the fixed brace, whereby the hollow needle is adapted for insertion into and removal from a rechargeable cell disposed in the cavity.

18 Claims, 3 Drawing Sheets

APPARATUS FOR MEASURING THE PRESSURE INSIDE A RECHARGEABLE ELECTROCHEMICAL CELL

FIELD OF THE INVENTION

The present invention relates generally to rechargeable electrochemical cells, and more particularly, to an apparatus for testing the internal pressure of sealed rechargeable electrochemical cells during operation and a method of using this apparatus.

BACKGROUND OF THE INVENTION

Rechargeable electrochemical cells may be used as direct replacements for primary AA, C, and D cells in numerous consumer devices such as calculators, portable radios, and flashlights. Often, rechargeable cells are integrated into a sealed power pack that is designed to interface with a specific device. In sealed power packs, weight and portability are important considerations. Long operating life and maintenance free operation are desirable characteristics for all rechargeable cells.

A rechargeable cell is ideally suited to serve as a portable power source due to its small size, light weight, high power capacity and long operating life. A rechargeable cell may operate as an "install and forget" power source. With the exception of periodic charging, such a rechargeable cell typically performs without attention and rarely becomes the limiting factor in the life of the device it powers.

Rechargeable cells using a hydrogen storage negative electrode are known in the art. See, for example, U.S. Pat. No. 4,551,400 (hereinafter "the 400 patent") for HYDROGEN STORAGE MATERIALS AND METHODS OF SIZING AND PREPARING THE SAME FOR ELECTROCHEMICAL APPLICATIONS, the disclosure of which is incorporated by reference. (Cells using rechargeable hydrogen storage negative electrodes are hereinafter referred to as "hydrogen storage cells.") Hydrogen storage cells operate in a different manner from lead-acid, nickel-cadmium, or other prior art battery systems. The metal hydride negative electrode used in hydrogen storage cells is capable of the reversible electrochemical storage of hydrogen. In hydrogen storage cells, the positive electrode is typically formed of a nickel hydroxide material. A suitable separator, spacer, or membrane may be positioned between the negative and positive electrodes.

Hydrogen storage cells operate with a nickel hydroxide positive electrode; a hydrogen storage alloy negative electrode; and a non-woven, felted, nylon or polypropylene separator. The electrolyte is generally 20 to 45 weight percent potassium hydroxide.

Hydrogen storage cells offer important advantages over conventional rechargeable cells. Hydrogen storage cells have significantly higher specific charge capacities (both in terms of ampere hours per unit mass and ampere hours per unit volume) than do cells that use lead or cadmium negative electrodes. As a result of the higher specific charge capacities, a higher energy density (in terms of watt hours per unit mass or watt hour per unit volume) is possible with a hydrogen storage cell than is possible with prior art systems such as the lead acid and NiCd. Thus, hydrogen storage cells are particularly suitable for many commercial applications.

The operation of a hydrogen storage cell produces hydroxyl ions, and may also produce gases under certain circumstances. As a result, the internal cell pressures may vary substantially during operation of a hydrogen storage cell. Because of this, hydrogen storage cells are typically produced as either sealed cells or vented cells. During normal operation, a sealed cell does not permit the venting of gas to the atmosphere. In contrast, a vented cell will release excess pressure by venting gas as part of its normal operation. As a result of this difference, the vent assemblies used in sealed and vented cells are quite different from one another, and the amounts of electrolyte in the cell container relative to the electrode geometry differ significantly.

Sealed cells are manufactured predominantly in cylindrical and rectangular configurations. Sealed cells are usually designed to operate in a starved electrolyte configuration. The cell enclosure for a sealed cell is normally metallic and designed for operation at pressures up to about 100 pounds per square inch absolute or even higher. Sealed cells are characterized by the substantial absence of any required maintenance.

A variation of sealed cells are cells containing "one time only" venting mechanisms, for example, a rupturable diaphragm and blade apparatus. As internal pressure increases, the blade is forced against the diaphragm. As the pressure further increases to the pressure limits of the particular cell configuration, the blade punctures the diaphragm, allowing excess gases to escape through the ruptured diaphragm without catastrophic cell failure.

Vented hydrogen storage cells, which have a nickel hydroxide positive electrode, and a hydrogen storage alloy negative electrode, typically employ a woven or non-woven separator. Vented cells differ most significantly from sealed cells in that they operate in a flooded condition. A "flooded condition", as used herein, refers to a cell in which the electrodes are completely immersed in electrolyte. Such cells are sometimes referred to as "flooded cells." A vented cell is further distinguished from a sealed cell in that it is designed for normal operating pressures of only up to about 10 pounds per square inch, after which excess pressures are relieved by a vent mechanism.

As discussed above, operation of a hydrogen storage cell produces hydroxide ions and can produce various gases. The amount of gases generated depends on the amount of electrolyte, the operating temperature, as well as variations in components, chemical concentrations, and manufacturing techniques.

Quality control review of all types of rechargeable cells generally involves measuring the pressures developed in finished cells during charge/discharge cycling. There are several methods of pressure measurement known in prior art. One involves the use of a strain gauge. Once amount of strain induced by the pressures developed in a cyclindrical can are very small. Unless very sensitive strain gauges are used, the measurements will be erroneous. A "one time only" method of instantaneous pressure measurement involves puncturing the can with a sharp "nail like" device connected to a gauge. Once measured, the cells cannot be resealed. With this method it is impossible to make multiple pressure measurements. The third method involves putting a hole through the lid or side and connecting a transducer to it. The disadvantage of this is that even a small amount of pressure in the cell serves to expel electrolyte through the drilled hole, thereby reducing the quantity of the electrolyte. Since the quantity of electrolyte lost is unpredictable and since pressure is dependent upon the quantity of electrolyte, pressures measured in this manner cannot be meaningfully interpreted. Additionally, meaningful data requires the measurement of pressure over hundreds of charge/recharge cycles. The pressure measurement techniques of the prior art required a new cell to be sacrificed for each measured data point.

Thus, not only were hundreds of cells sacrificed for each set of measurements, but variations from cell to cell had to be taken into consideration in interpreting the results.

The hydrogen storage cells described in the '400 patent, require a heat treatment process for activation. Pressure tends to build up within the cell during this activation process. When a hole is made in the can in order to make a pressure measurement, this activation process greatly contributes to the loss of electrolyte. Even if the hole is formed prior to charge/discharge cycling, the activation process nonetheless initiates a pressure rise and a corresponding loss of electrolyte, which results in a reduction of the internal pressure. Tape cannot be used to cover the hole as the electrolyte tends to "creep" through the hole and destroy the adhesive on the tape. Even in those instances in which the tape survives the initial activation, the pressure rise causes electrolyte leakage when the tape is punctured after heat treatment. Attempts to secure the tape to cover the hole internally have been unsuccessful because the tape interferes with the process of inserting the core into the can; and the electrolyte attacks and eventually releases the adhesive.

A need exists to more efficiently measure the internal pressure in all types of rechargeable cells, particularly metal hydride cells, during normal and worst case operation. Such a pressure measurement must be nondestructive and compatible with continuous charge/discharge cycling of the cell so that the pressures resulting from actual use of the cell can be determined without loss of electrolyte.

BRIEF SUMMARY OF THE INVENTION

The present invention involves a novel testing apparatus for accurately measuring the pressure inside rechargeable cells, particularly inside hydrogen storage cells. The apparatus includes a frame including at least one cavity adapted to releasably seat an electrochemical cell; a fixed brace defining a first end of this at least one cavity; a movable brace defining the end of the at least one cavity opposite from said fixed brace, the movable brace including a hollow needle having a pointed end which is operatively directed toward one end of an electrochemical cell disposed in the cavity, and means for sealing a point where the hollow needle is inserted into an electrochemical cell; a pressure transducer operatively connected with the hollow needle; and means for controllably moving the movable brace relative to the fixed brace, whereby the hollow needle is adapted for insertion into and removal from an electrochemical cell disposed in the cavity.

In a preferred embodiment, the first and second braces are at least partially formed of an insulating material. The means for controllably moving the movable brace relative to the fixed brace preferably comprises a bolt threadably connected to the fixed brace which bears upon the movable brace such that rotation of the bolt moves the movable brace relative to the fixed brace.

Preferably, the hollow needle has a maximum outer dimension in the range of 0.05" to 0.20" and a maximum internal dimension of 0.02" to 0.06". Such dimensions allow for operation of the pressure transducer while reducing the overall dimensions of the needle so as to provide a minimum puncture size in the electrochemical cell. The means for sealing the point of insertion of the hollow needle and the rechargeable cell comprises an elastomeric O-ring operatively surrounding, and in close proximity to, the hollow needle.

The apparatus is adapted for the simultaneous and accurate measurement of pressure inside a plurality of electrochemical cells. Thus, the frame is equipped with a plurality of cavities for housing a plurality of rechargeable cells. The fixed first brace defines the lower end of each of the plurality of cavities and is adapted to removably support a corresponding plurality of rechargeable cells, preferably in an upright position. The movable brace defines the upper end of each of the cavities and supports a corresponding plurality of hollow needles, the pointed ends of which are directed toward the cavities. Finally, a plurality of pressure transducers are operatively connected in pressure transmissive communication with a corresponding number of the hollow needles so as to measure the pressure developed during the operative charge/discharge cycling of each of the rechargeable cells.

More specifically, the lower end of the movable brace is adapted to releasably engage the upper end of the rechargeable cell. A pressure transducer is mounted on the movable brace in pressure transmissive communication with the hollow needle, the point end of which projects toward and penetrates the upper surface of the rechargeable cell. An elastomeric O-ring, disposed on the brace, completely surrounds the hollow needle and, when pressed against the upper surface of the cell, seals the point where the hollow needle penetrates the rechargeable cell. More specifically, the pressure transducer can be two strain gauges in a bridge type pressure transducer.

Another embodiment of the present invention is a method for accurately measuring the internal pressure of a rechargeable cell during charge/discharge cycling. In this embodiment, a rechargeable cell is secured in a substantially upright position. The pointed end of a hollow needle is inserted into and penetrates the head space of the casing which encapsulates the top end of the rechargeable cell. The point of penetration of the hollow needle into the upper surface of the casing of the rechargeable cell is releasably sealed to prevent the release of electrolyte. A pressure transducer is provided in pressure transmissive communication with the hollow needle and operates to transmit an electrical signal corresponding to the pressure which it senses in the interior of the electrochemical cell. The cell is then subjected to charge/discharge cycling so that the electrical signal generated by the transducer corresponds to the pressure that exists inside the rechargeable cell during its operation. Since no electrolyte can leak past the seal, the pressure transducer accurately measures the internal cell pressure.

The method for measuring the pressure inside a rechargeable electrochemical cell of the present invention further includes the steps of measuring the pressure at an intermediate stage during the cell's manufacture where the rechargeable cell includes an upper cell cover having an opening for the subsequent attachment of a typical vent mechanism. When employed in this manner, prior to the final assembly of the cell, a section of teflon tape is placed over the opening in the cell cover. The free end of the hollow needle may then be inserted into and penetrate through the cover of the rechargeable cell (through the teflon tape covering the opening). After testing, the vent assembly may be secured, the battery packaged, and other final manufacturing steps performed.

DETAILED DESCRIPTION OF THE INVENTION

The present invention provides an improved apparatus for making nondestructive and accurate measurements of the operating pressure which exists inside rechargeable electrochemical cells during charge/discharge cycling. Preferably, such pressure testing will occur on cells randomly selected from an intermediate stage of a manufacturing run so that various statistically significant manufacturing batches may be sampled and tested.

Figure 1:
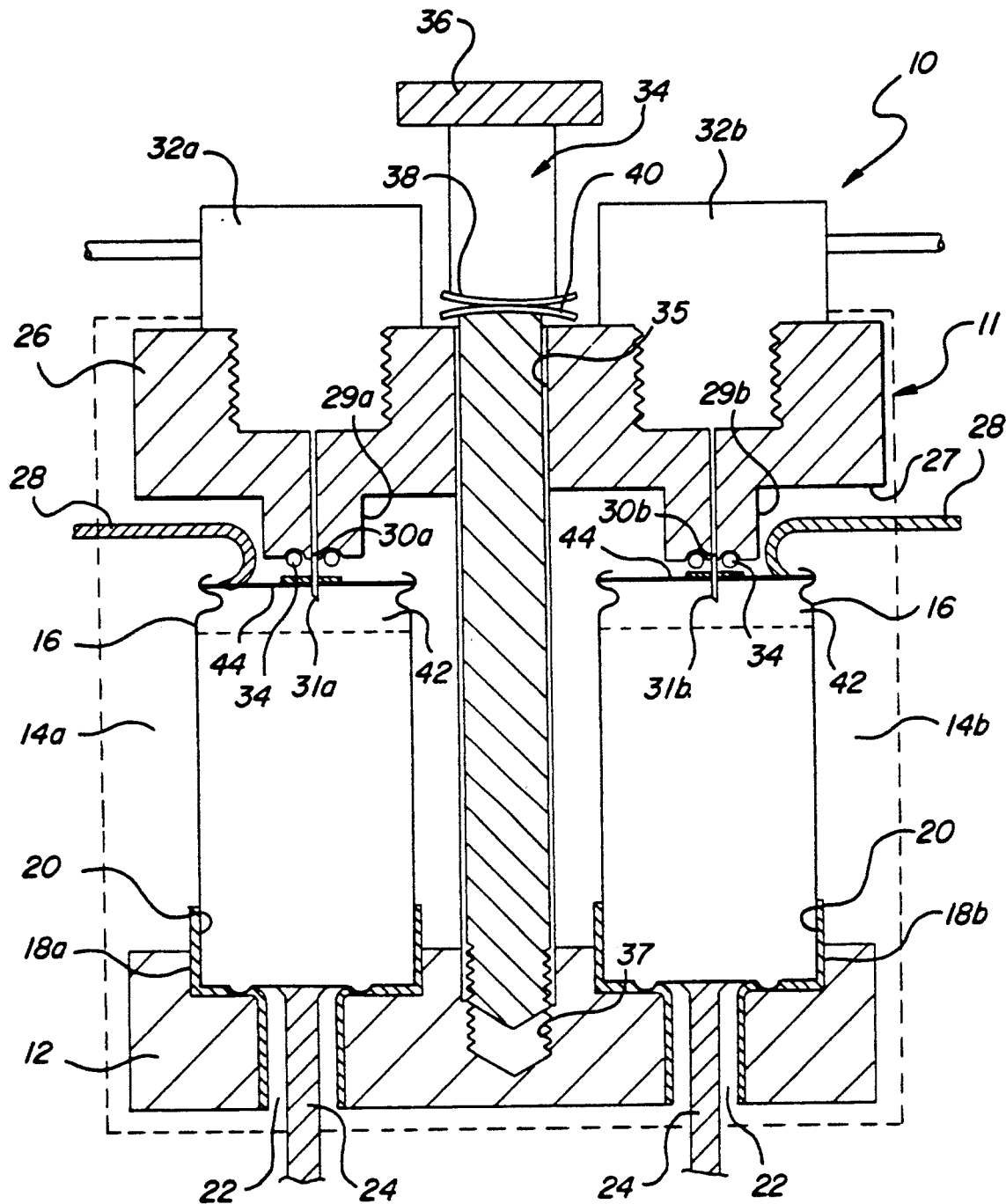
FIG. 1 is a cross-sectional side view of an embodiment of the present invention.

In FIG. 1, the pressure measuring apparatus of the invention 10 includes a frame 11 formed from a rigid lower brace 12 fixedly secured so as to define the lower end of at least one, and preferably a plurality of, cavities 14A, 14B in which a corresponding number of rechargeable electrochemical cells 16 are removably seated. The lower brace 12 includes depressions 18A, 18B configured and dimensioned to firmly engage the lower end of the rechargeable cells 16 and operative to support these cells 16 in a generally upright attitude within their respective cavities 14A, 14B. The depressions 18A, 18B are lined with an insulating material 20, such as a polymeric plastic resin, so that the terminals associated with the lower ends of the rechargeable cells 16 are prevented from making electrical contact with any electrically conductive portion of the structural brace 12 of the frame 11. Of course, electrical contact with a conductive element would adversely affect the operation of the cells during pressure testing. The fixed brace 12 further includes openings 22 through which electric connectors 24 can make electrical contact with the terminals on the lower end of the rechargeable cells 16 during charge/discharge cycling.

A rigid movable brace 26 is operatively disposed at the upper end of the frame 11 to define the upper end of the cavities 14A, 14B. The movable brace 26 is configured and dimensioned so that its lower end portions engage the upper end of the rechargeable cells 16 removably disposed in cavities 14A, 14B. The movable brace 26 is also adapted to allow for electrical connectors 28 to electrically communicate with the terminals on the upper end of the rechargeable cells 16 removably disposed in cavities 14A, 14B. More specifically, the portion of the movable brace 26 positioned above the cavities 14A, 14B includes an annularly shaped recess 27 about its periphery, allowing the connectors 28 to be electrically connected to the terminals on the upper end of cells 16.

The movable brace 26 is adapted to directly engage the upper ends of the rechargeable cells 16. A pair of elongated hollow needles 30A, 30B are secured to the movable brace 26 so that their pointed ends 31A, 31B extend from the brace 26 and project into corresponding cavities 14A, 14B toward the upper surface of the rechargeable cells 16 disposed in the cavities. A pair of pressure transducers 32A, 32B are mounted on the movable brace 26 in pressure transmissive communication with the hollow needles 30A, 30B. The pressure transducers 32A, 32B are preferably of the type generally referred to as a strain gauge type pressure transducer. Preferably, the hollow needles 30A, 30B have a maximum outer dimension in the range of 0.05" to 0.20" and a maximum inner dimension of 0.02" to 0.06"; preferably an outer dimension of 0.125" tapering to a 50° chisel point and an inner dimension of 0.040". Such dimensions allow for the pressure conditions existing within the cells 16 to be communicated to and sensed by the pressure transducers 31A, 32B while minimizing the size of the needles 30A, 30B to correspondingly minimize the amount of electrolyte leaking from the cells 16 after puncture.

Both the fixed brace 12 and the movable brace 26 are preferably formed from an inexpensive, rigid material capable of providing the necessary structural support.

The measuring apparatus 10 of the invention further includes means for controllably moving the movable brace 26 relative to the fixed brace 12 such that the hollow needles 30 may be inserted into and removed from the head space existing within the upper end of each of the rechargeable cells 16 operatively disposed in the cavities 14A, 14B. Projecting from the lower end of the movable brace 26 are a pair of nipples 29A, 29B. On the bottom surface of each of these nipples is a small diameter elastomeric O-ring 34. The inner diameter of the O-ring 34 approximates the outer diameter of, and is adapted to be operatively disposed about each of the hollow needles 30. In this manner, the point of insertion of the needle 30 into the upper surface of each rechargeable cell 16 is sealed to prevent the flow of electrolyte from the cell, to insure an accurate measurement of the internal cell pressure can be obtained.

A bolt 34 is adapted to be received within bore 35 formed in the movable brace 26 and is threadably connected in bore 37 within the fixed brace 12. The bolt 34 includes an upper end which has a flat portion 38 for bearing against the movable brace 26 such that rotation of the bolt is adapted to move the movable brace 26 downwardly or upwardly relative to the fixed brace 12. The knob 36 on bolt 34 is knurled to aid in the manual rotation by providing a conveniently sized gripping surface. A pair of flexible washers 40 are disposed between the flat section 38 and the movable brace 26 to facilitate rotation of the bolt 34.

In this fashion, the apparatus 10 is adapted to accurately measure the interior pressure of a plurality of rechargeable cells 16. In summary, the frame 11 defines a plurality of cavities 14A, 14B for removably supporting a corresponding plurality of rechargeable cells 16. While the configuration illustrated in FIG. 1 depicts two such cavities 14, any number of cavities 14 may be similarly defined so as to accurately and simultaneously measure the pressure in a given number of rechargeable cells 16 without departing from the spirit or scope of the present invention.

Figure 2:
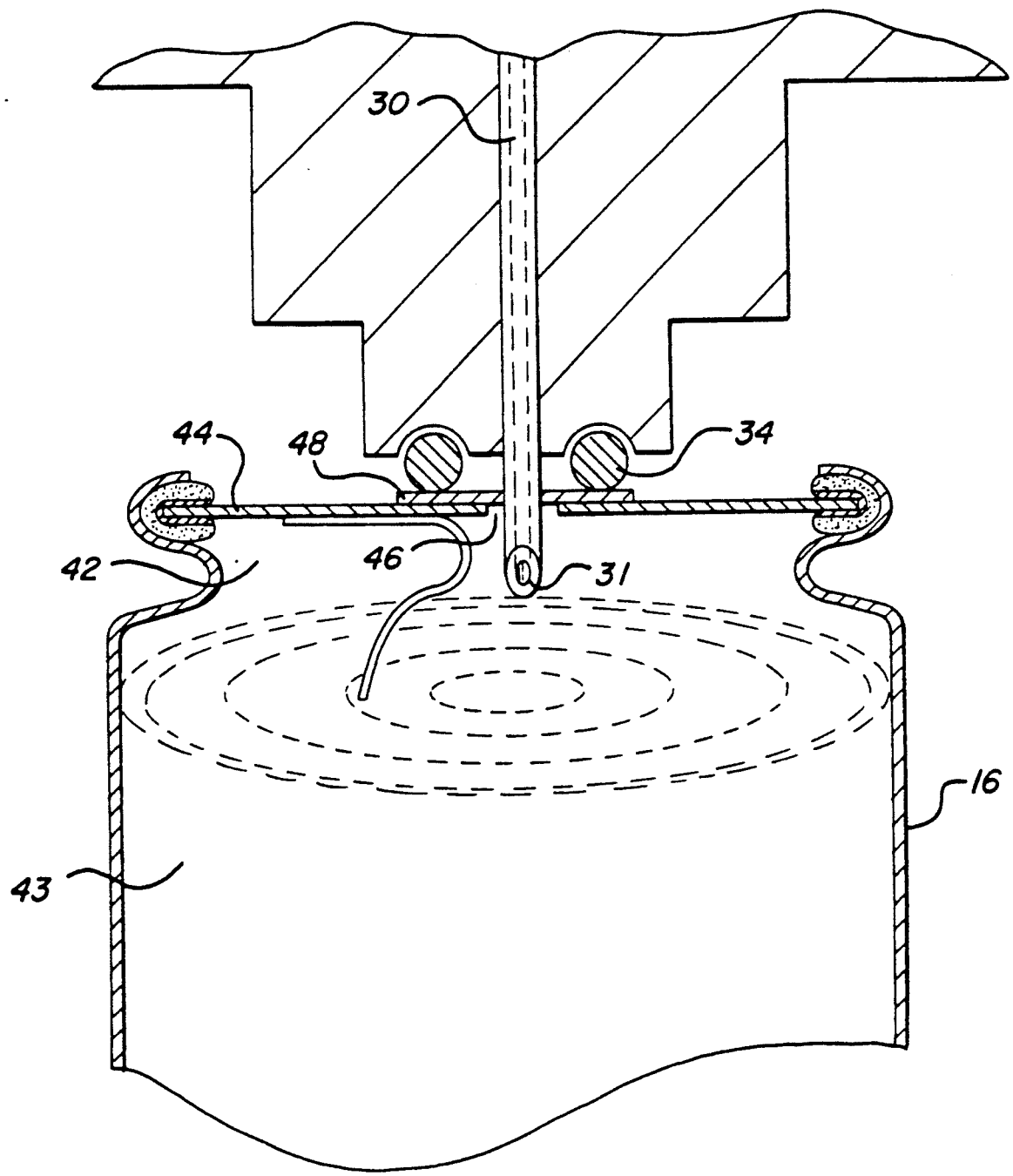
FIG. 2 is an enlarged view illustrating the relationship between the pressure transducer, hollow needle, and elastomeric seal of an embodiment of the present invention and showing the point of penetration of the needle through a rechargeable cell.

With reference now to FIG. 2, it can be seen that the present invention also allows for accurately measuring the pressure existing inside a rechargeable cell 16 during its electrical operation. For example, a rechargeable cell 16 is initially secured within the cavity 14 in a generally upright attitude. The free end 31 of the hollow needle 30 is inserted through the cover plate 44 and into the "head space" 42 of the rechargeable cell 16. The "head space" as used herein is defined as the volume existing at the top of the cell which is not filled with electrolyte 43. The point of insertion of the pointed end 31 of the hollow needle 30 through the cover plate 44 of the rechargeable cell 16 is releasably sealed by the elastomeric O-ring 34 as a further precaution in preventing the loss of electrolyte 43. The pressure transducer (not shown in FIG. 2) communicates with the interior of the cell 16 through the hollow needle 30 and therefore operates to provide an electrical signal corresponding to the interior pressure of the cell. Thereafter, the cell 16 is electrically operated through charge/discharge cycles so that the electrical signal provided by the transducer 32 corresponds to the pressure range experienced by the rechargeable cell during the normal operation thereof. It is to be specifically noted that performance of the testing apparatus and method of the instant invention requires the needle to penetrate into the head space 42 and stop short of the electrolyte 43.

The rechargeable cell 16 may also be tested at an intermediate stage in its manufacture when the rechargeable cell 16 includes the upper cell cover plate 44 having an opening 46 in it for the subsequent attachment of a vent mechanism (not shown). In such intermediate operation of the pressure measuring assembly of the instant invention, prior to the final assembly of the cell 16, teflon tape 48 is placed over the opening 46 so that the cell 16 may be pressure tested. This is accomplished by inserting the free end 31 of the hollow needle 30 into the head space 42 of the rechargeable cell 16 through the teflon tape 48. Although not essential to the understanding of the instant invention, it is noteworthy that the electrolyte 43 does not adversely affect the adhesive on the inside surface of the tape 48 since the tape is placed on the upper surface of the cell 16 and the cell is stored and mounted in an upright position. Securing the vent assembly, packaging, and other final manufacturing steps may be performed subsequent to such pressure testing.

Figure 3:
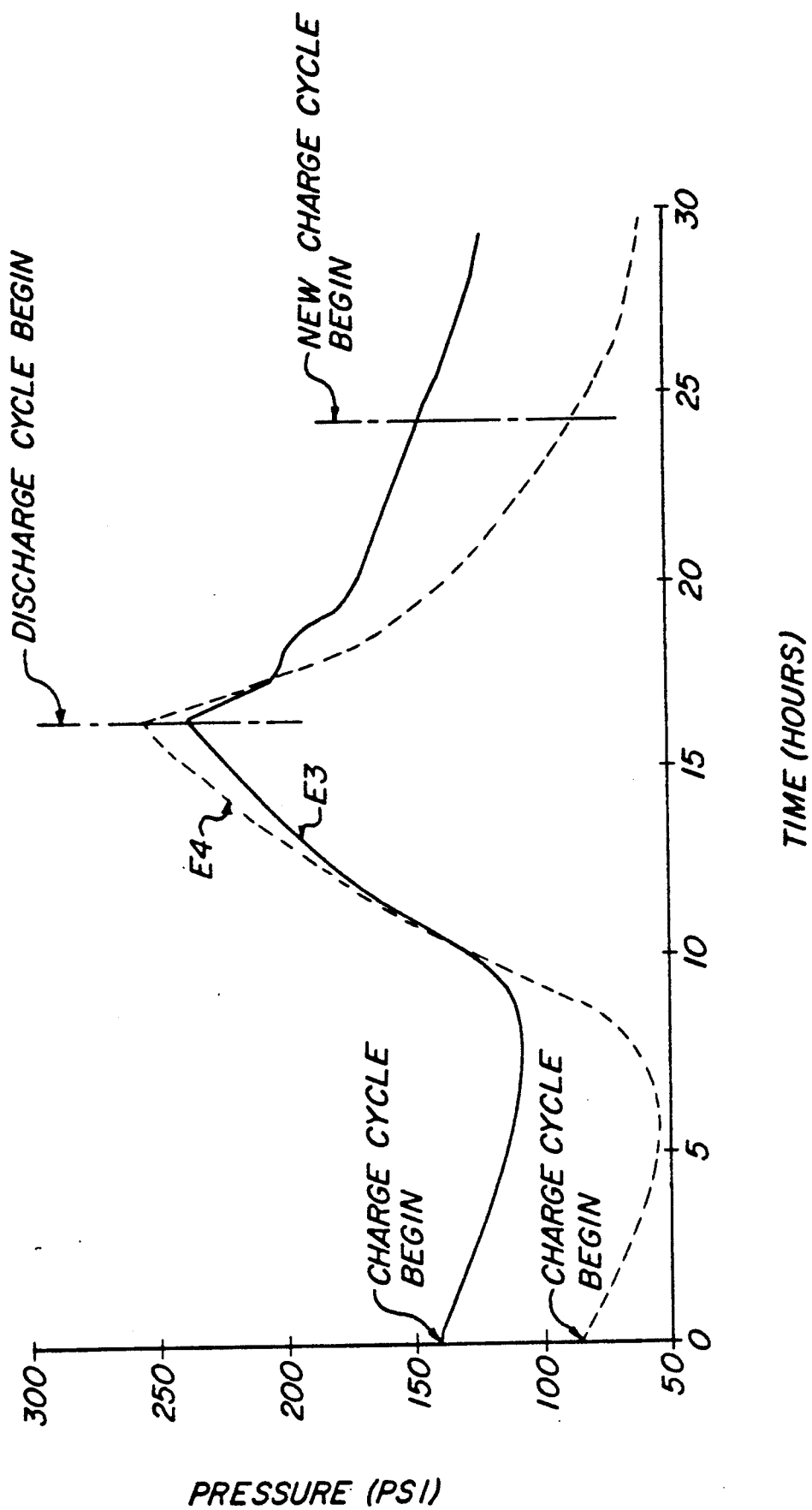
FIG. 3 shows data resulting from the use of an embodiment of the present invention for a pair of rechargeable cells.

FIG. 3 shows an example of pressure testing a pair of rechargeable cells 16 utilizing the method and apparatus of the present invention. FIG. 3 reveals the typical pressure buildup associated with changing of the cells 16 and a corresponding reduction in pressure as discharge takes place. The point to be noted from an analysis of the data contained in FIG. 3 is that the pressures measured utilizing the concept of the present invention showed no scatter and therefore (contrary to the prior art apparatus) a meaningful interpretation of this data is possible. This accuracy of measurement was due to the fact that no electrolyte is lost when the cell is being tested. Since no electrolyte is lost, the pressure measured reflects the actual pressure within the cell casing.

From the foregoing description of the preferred embodiment, it can be seen that various alternative embodiments of the invention can be anticipated without departing from the spirit or scope of the invention as defined in the following claims.

What is claimed is:

1. An apparatus for accurately measuring pressure within a rechargeable cell while charge/discharge cycling said cell, said apparatus comprising:
   a frame defining at least one cavity;
   a fixed brace attached to said frame, said fixed brace configured to releasably secure a rechargeable cell in said at least one cavity;
   a movable brace movably fixed to said frame at a position opposite from said fixed brace said movable brace supporting
      a hollow needle having a pointed end, said hollow needle protruding from said movable brace and surrounded by a seal; and
      a pressure transducer operatively connected with said hollow needle; such that said movable brace can be moved relative to said fixed brace to insert said hollow needle into said rechargeable cell and as said hollow needle is inserted into said rechargeable cell said seal contacts said rechargeable cell to form a hermetic seal, and
   electrical connectors in said fixed brace and said moveable brace in contact with terminals on said rechargeable cell to permit charge/discharge cycling of said rechargeable cell while interior pressure measurements are taken via said hollow needle.

2. The apparatus of claim 1, wherein:
   said fixed brace is at least partially formed of an insulating material.

3. The apparatus of claim 1, wherein:
   said movable brace is at least partially formed of an insulating material.

4. The apparatus of claim 1, wherein:
   said pressure transducer is a strain gauge bridge type pressure transducer.

5. The apparatus of claim 1, wherein:
   said hollow needle has a maximum outside dimension in the range of 0.05" to 0.20".

6. The apparatus of claim 1, wherein:
   said hollow needle has a maximum inside dimension in the range of 0.02" to 0.06".

7. The apparatus of claim 1, wherein:
   said seal comprises an elastomeric O-ring.

8. The apparatus of claim 1, wherein:
   said fixed brace is configured to secure a plurality of rechargeable cells; and
   said movable brace is configured to correspond to said fixed brace and to support a number of hollow needles and a number of pressure transducers corresponding to the number of said plurality of rechargeable cells, said pointed end of each hollow needle is directed toward said cavities.

9. An apparatus for accurately measuring the pressure within a rechargeable cell, said apparatus comprising:
   a frame for removably positioning a rechargeable cell in an upright orientation;
   a movable brace adapted to movably engage a first end of said rechargeable cell and to electrically communicate with a terminal of said rechargeable cell, said movable brace including a hollow needle, said hollow needle having a pointed end which is operatively directed toward one end of said rechargeable cell;
   a pressure transducer mounted on said movable brace in pressure transmissive communication with said hollow needle;

means for controllably moving said movable brace relative to said fixed brace, whereby said hollow needle is adapted for insertion into and removal from said rechargeable cell; and an elastomeric O-ring adapted to seal the point of insertion of said hollow needle into said rechargeable cell.

10. The apparatus of claim 9, wherein:

said frame further includes a fixed brace adapted to support said rechargeable cell in said upright orientation.

11. The apparatus of claim 10, wherein:

said means for controllably moving said movable brace comprises a bolt threadably connected to said fixed brace and bearing upon said movable brace such that rotation of said bolt moves said movable brace relative to said fixed brace.

12. The device of claim 9, wherein:

said pressure transducer is a strain gauge bridge type pressure transducer.

13. The device of claim 9, wherein:

said hollow needle has a maximum outer dimension in the range of 0.05" to 0.20".

14. The device of claim 9, wherein:

said hollow needle has a maximum interior dimension in the range of 0.02" to 0.06".

15. A method for accurately measuring the pressure within a rechargeable battery during operation, said method including the steps of:

securing said rechargeable cell in a fixed position;

inserting a hollow needle into the head space of said rechargeable cell using a hollow needle;

releasably sealing the point of insertion of said hollow needle;

operatively disposing a pressure transducer in pressure transmissive communication with said hollow needle, said transducer adapted to provide an electrical signal corresponding to sensed pressure; and electrically operating said rechargeable cell, whereby the electrical signal provided by said transducer corresponds to the pressure inside said rechargeable cell.

16. The method of claim 15, wherein:

said step of releasably sealing the point of insertion of said hollow needle includes the step of disposing an elastomeric O-ring about said hollow needle.

17. The method of claim 15, further including the steps of:

measuring the pressure inside a rechargeable cell at an intermediate stage of manufacture wherein the cell includes an upper cell cover having an opening for the subsequent attachment of a pressure vent mechanism;

placing teflon tape over said opening in said upper cell cover; and said step of disposing the free end of a hollow needle into the one end of the rechargeable cell includes inserting said hollow needle through the teflon tape.

18. The method of claim 17, wherein:

said step of releasably sealing the point of insertion of said hollow needle into one end of said rechargeable cell includes disposing an elastomeric O-ring about said hollow needle so as to releasably press against at least a portion of said teflon tape.

* * * * *